US012767542B2

(12) United States Patent
GilroySmith et al.

(10) Patent No.: US 12,767,542 B2
(45) Date of Patent: Oct. 20, 2026

(54) PRODUCING CARBON DIOXIDE WITH WASTE HEAT

(71) Applicant: X Development LLC, Mountain View, CA (US)

(72) Inventors: Bryan Christopher GilroySmith, Palo Alto, CA (US); Jacques Gagne, Palo Alto, CA (US); Robert Nelson, Palo Alto, CA (US); Christopher Gregory Malone, Palo Alto, CA (US)

(73) Assignee: 280 Earth, Inc., Palo Alto, CA (US)

( * ) Notice: Subject to any disclaimer, the term of this patent is extended or adjusted under 35 U.S.C. 154(b) by 0 days.

(21) Appl. No.: 18/948,550

(22) Filed: Nov. 15, 2024

(65) Prior Publication Data

US 2025/0066207 A1 Feb. 27, 2025

Related U.S. Application Data

(63) Continuation of application No. 18/316,769, filed on May 12, 2023, now Pat. No. 12,145,850, which is a continuation of application No. 17/216,902, filed on Mar. 30, 2021, now Pat. No. 11,685,658.

(60) Provisional application No. 63/029,255, filed on May 22, 2020, provisional application No. 63/001,948, filed on Mar. 30, 2020.

(51) Int. Cl.
*C01B 32/50* (2017.01)
*B01D 53/62* (2006.01)
*F25J 3/02* (2006.01)

(52) U.S. Cl.
CPC .............. *C01B 32/50* (2017.08); *B01D 53/62* (2013.01); *F25J 3/0266* (2013.01)

(58) Field of Classification Search
CPC ......... C01B 32/50; B01D 53/62; F25J 3/0266
See application file for complete search history.

(56) References Cited

U.S. PATENT DOCUMENTS

2010/0018218 A1* 1/2010 Riley ........................ F02C 3/34
60/39.12
2011/0266500 A1* 11/2011 Schubert .................. C10J 3/723
422/198

FOREIGN PATENT DOCUMENTS

KR 20110013953 A * 2/2011 .............. F25B 30/06

OTHER PUBLICATIONS

English Translation KR 20110013953 A (Year: 2011).*

* cited by examiner

*Primary Examiner* — Shafiq Mian
(74) *Attorney, Agent, or Firm* — Steven Stupp

(57) ABSTRACT

Techniques for providing carbon dioxide include generating thermal energy, an exhaust fluid, and electrical power from a power plant; providing the exhaust fluid and the generated electrical power to an exhaust fluid scrubbing system to separate components of the exhaust fluid; capturing heat from a source of heat of an industrial process in a heating fluid; transferring the heat of the industrial process captured in the heating fluid to a carbon dioxide source material of a direct air capture (DAC) system; providing the generated electrical power from the power plant to the DAC system; providing the thermal energy from the power plant to the DAC system; and separating, with the transferred portion of the heat of the industrial process and the provided thermal energy, carbon dioxide from the carbon dioxide source material of the DAC system.

20 Claims, 6 Drawing Sheets

PRODUCING CARBON DIOXIDE WITH WASTE HEAT

CROSS-REFERENCE TO RELATED APPLICATIONS

This application is a continuation of U.S. patent application Ser. No. 18/316,769, filed May 12, 2023, which is a continuation of U.S. patent application Ser. No. 17/216,902, filed Mar. 30, 2021 (now U.S. Pat. No. 11,685,658), which claims priority under 35 U.S.C. § 119 to U.S. Provisional Patent Application Ser. No. 63/001,948, filed on Mar. 30, 2020, and U.S. Provisional Patent Application Ser. No. 63/029,255, filed on May 22, 2020. The entire contents of the prior applications are incorporated by reference herein.

TECHNICAL BACKGROUND

This disclosure relates to producing carbon dioxide with waste heat and, more particularly, producing carbon dioxide in a direct air capture (DAC) process with waste heat from an industrial process.

BACKGROUND

Carbon dioxide may be captured from ambient air and used for a variety of applications. In some aspects, energy, in the form of electrical power and thermal energy, is required to capture the carbon dioxide in a cyclical process.

SUMMARY

This disclosure describes methods and systems for producing carbon dioxide captured in a direct air capture (DAC) process with waste heat from an industrial process. In some aspects, waste heat from an industrial process, such as heat derived or generated from a data center, is used in combination with one or more heat pump assemblies to separate the captured carbon dioxide from a solid or liquid material in which it is entrained (e.g., by breaking bonds between the carbon dioxide and the solid or liquid with the heat).

This disclosure further describes example implementations of an integrated carbon dioxide capture system that utilizes waste heat from one or more sources to separate carbon dioxide from a fluid, such as an atmospheric airflow that includes carbon dioxide. In some aspects, such an integrated system may include a power plant and an industrial process, both of which may generate waste heat that can be captured. In some aspects, the power plant has a power generation capacity that is at least sized to provide a backup power capacity to the industrial process. In some aspects, the industrial process may include a data center that generates waste heat through the operation of many (e.g., hundreds, thousands, tens of thousands, or more) server devices (e.g., processors, voltage regulators, memory modules, and/or other devices) that generate heat.

In a general implementation, a carbon dioxide production system includes an industrial process that includes a source of heat thermally coupled to a heating fluid to transfer heat from the source of heat to the heating fluid; a heating system that includes at least one thermodynamic cycle including a refrigerant fluid thermally coupled to the heating fluid, the refrigerant fluid including a thermal energy from at least a portion of the heat from the source of heat from the heating fluid and a heat of compression of the at least one thermodynamic cycle; and a direct air capture (DAC) system that includes a carbon dioxide source material thermally coupled to the refrigerant fluid to receive at least a portion of the thermal energy to separate carbon dioxide from the carbon dioxide source material.

In an aspect combinable with the general implementation, the industrial process includes a data center, and the source of heat includes a plurality of data center heat-generating electronic devices.

In another aspect combinable with any one of the previous aspects, the plurality of data center heat-generating electronic devices include a plurality of hardware processors.

In another aspect combinable with any one of the previous aspects, the at least one thermodynamic cycle includes at least one vapor-compression cycle, and the heating system includes a heat-pump system.

In another aspect combinable with any one of the previous aspects, the at least one vapor-compression cycle includes a compressor, a condenser, an evaporator, and an expansion device fluidly coupled in a refrigerant circuit that includes the refrigerant fluid.

In another aspect combinable with any one of the previous aspects, the at least one vapor-compression cycle includes a first vapor-compression cycle that includes a first heat exchanger, a first refrigerant fluid thermally coupled to the heating fluid in the first heat exchanger, a first compressor fluidly coupled to the first heat exchanger, a second heat exchanger fluidly coupled to the first compressor, and a first expansion device fluidly coupled to the second heat exchanger.

In another aspect combinable with any one of the previous aspects, the at least one vapor-compression cycle includes a second vapor-compression cycle that includes the second heat exchanger, a second refrigerant fluid thermally coupled to the first refrigerant fluid in the second heat exchanger, a second compressor fluidly coupled to the second heat exchanger, a third heat exchanger fluidly coupled to the second compressor, and a second expansion device fluidly coupled to the third heat exchanger.

In another aspect combinable with any one of the previous aspects, the carbon dioxide source material is thermally coupled to the second refrigerant fluid to receive the portion of the thermal energy to separate carbon dioxide from the carbon dioxide source material.

In another aspect combinable with any one of the previous aspects, the portion of the thermal energy includes the portion of the heat from the source of heat from the heating fluid and a heat of compression of the first and second compressors.

In another aspect combinable with any one of the previous aspects, the at least one vapor-compression cycle further includes a third vapor-compression cycle that includes the third heat exchanger, a third refrigerant fluid thermally coupled to the second refrigerant fluid in the third heat exchanger, a third compressor fluidly coupled to the third heat exchanger, a fourth heat exchanger fluidly coupled to the third compressor, and a third expansion device fluidly coupled to the fourth heat exchanger.

In another aspect combinable with any one of the previous aspects, the carbon dioxide source material is thermally coupled to the third refrigerant fluid to receive the portion of the thermal energy to separate carbon dioxide from the carbon dioxide source material.

In another aspect combinable with any one of the previous aspects, the portion of the thermal energy includes the portion of the heat from the source of heat from the heating fluid and a heat of compression of the first, second, and third compressors.

In another aspect combinable with any one of the previous aspects, at least one of the first, second, third, or fourth heat exchangers includes a plate-and-frame heat exchanger.

In another aspect combinable with any one of the previous aspects, at least one of the first, second, or third refrigerant fluids includes 1,1,1,2-Tetrafluoroethane.

In another aspect combinable with any one of the previous aspects, the carbon dioxide source material includes a liquid including atmospheric carbon dioxide.

In another general implementation, a method for providing carbon dioxide includes capturing heat from a source of heat of an industrial process in a heating fluid; transferring at least a portion of the heat from the heating fluid to a refrigerant fluid circulating through at least one thermodynamic cycle of a heating system, the refrigerant fluid including a thermal energy from the portion of the heat from the source of heat in the heating fluid and a heat of compression of the at least one thermodynamic cycle; transferring at least a portion of the thermal energy of the refrigerant fluid to a carbon dioxide source material of a direct air capture (DAC) system; and separating, with the portion of the thermal energy, carbon dioxide from the carbon dioxide source material.

In an aspect combinable with the general implementation, the industrial process includes a data center, and the source of heat includes a plurality of data center heat-generating electronic devices.

In another aspect combinable with any one of the previous aspects, the plurality of data center heat-generating electronic devices include a plurality of hardware processors.

In another aspect combinable with any one of the previous aspects, the at least one thermodynamic cycle includes at least one vapor-compression cycle, and the heating system includes a heat-pump system.

In another aspect combinable with any one of the previous aspects, the at least one vapor-compression cycle includes a compressor, a condenser, an evaporator, and an expansion device fluidly coupled in a refrigerant circuit that includes the refrigerant fluid.

In another aspect combinable with any one of the previous aspects, transferring the portion of the heat from the heating fluid to the refrigerant fluid circulating through the at least one vapor-compression cycle of the heat pump system includes transferring the portion of the heat from the heating fluid to a first refrigerant fluid thermally coupled to the heating fluid in a first heat exchanger of a first vapor-compression cycle; compressing the first refrigerant fluid in a first compressor fluidly coupled to the first heat exchanger to add a first heat of compression to the first refrigerant fluid; transferring a thermal energy from the first refrigerant fluid that includes the portion of the heat from the heating fluid and the first heat of compression to a second refrigerant fluid of a second vapor-compression cycle in a second heat exchanger fluidly coupled to the first compressor; and compressing the second refrigerant fluid in a second compressor fluidly coupled to the second heat exchanger to add a second heat of compression to the second refrigerant fluid.

Another aspect combinable with any one of the previous aspects further includes transferring a thermal energy from the second refrigerant fluid that includes the portion of the heat from the heating fluid and the first and second heat of compressions to the carbon dioxide source material of the DAC system.

Another aspect combinable with any one of the previous aspects further includes transferring the thermal energy from the second refrigerant fluid that includes the portion of the heat from the heating fluid and the first and second heat of compression to a third refrigerant fluid of a third vapor-compression cycle in a third heat exchanger fluidly coupled to the second compressor; and compressing the third refrigerant fluid in a third compressor fluidly coupled to the third heat exchanger to add a third heat of compression to the third refrigerant fluid.

Another aspect combinable with any one of the previous aspects further includes transferring a thermal energy from the third refrigerant fluid that includes the portion of the heat from the heating fluid and the first, second, and third heat of compressions to the carbon dioxide source material of the DAC system.

In another aspect combinable with any one of the previous aspects, at least one of the first, second, or third heat exchangers includes a plate-and-frame heat exchanger.

In another aspect combinable with any one of the previous aspects, at least one of the first, second, or third refrigerant fluids includes 1,1,1,2-Tetrafluorocthane.

In another aspect combinable with any one of the previous aspects, the carbon dioxide source material includes a liquid including atmospheric carbon dioxide.

In another general implementation, a system includes a power plant that includes outputs including thermal energy, an exhaust fluid, and electrical power; an industrial process that is electrically coupled to the electrical power output of the power plant and that includes a source of heat thermally coupled to a heating fluid to transfer heat from the source of heat to the heating fluid; an exhaust fluid scrubbing system electrically coupled to the electrical power output of the power plant and configured to separate components of the exhaust fluid; and a direct air capture (DAC) system electrically coupled to the electrical power output of the power plant. The DAC system includes a carbon dioxide source material thermally coupled to at least one of the heating fluid or the thermal energy output of the power plant to receive heat to separate carbon dioxide from the carbon dioxide source material.

In an aspect combinable with the general implementation, the industrial process includes a data center, and the source of heat includes a plurality of data center heat-generating electronic devices.

In another aspect combinable with any one of the previous aspects, the plurality of data center heat-generating electronic devices include a plurality of hardware processors.

In another aspect combinable with any one of the previous aspects, the power plant includes a natural gas power plant that includes an input including natural gas, and the exhaust fluid includes carbon dioxide.

In another aspect combinable with any one of the previous aspects, the exhaust fluid scrubbing system is configured to separate the exhaust fluid into a carbon dioxide fluid stream and an effluent fluid stream that is substantially free of carbon dioxide.

In another aspect combinable with any one of the previous aspects, at least two of the industrial process, the exhaust fluid scrubbing system, or the DAC system are electrically coupled to the electrical power output of the power plant through at least one switch.

In another aspect combinable with any one of the previous aspects, the at least one switch includes at least one automatic transfer switch.

In another aspect combinable with any one of the previous aspects, the at least two of the industrial process, the exhaust fluid scrubbing system, or the DAC system include the industrial process and the DAC system.

In another aspect combinable with any one of the previous aspects, at least a portion of the electrical power output from the power plant approximates a backup electrical power input of the industrial process.

In another aspect combinable with any one of the previous aspects, a maximum output of the electrical power output from the power plant approximates a backup electrical power input of the industrial process.

Another aspect combinable with any one of the previous aspects further includes a heating system that includes at least one thermodynamic cycle including a refrigerant fluid thermally coupled to the heating fluid.

In another aspect combinable with any one of the previous aspects, the refrigerant fluid includes a thermal energy from at least a portion of the heat from the source of heat from the heating fluid and a heat of compression of the at least one thermodynamic cycle.

In another aspect combinable with any one of the previous aspects, the at least one thermodynamic cycle includes at least one vapor-compression cycle, and the heating system includes a heat-pump system.

In another aspect combinable with any one of the previous aspects, the at least one vapor-compression cycle includes a compressor, a condenser, an evaporator, and an expansion device fluidly coupled in a refrigerant circuit that includes the refrigerant fluid.

In another aspect combinable with any one of the previous aspects, the at least one vapor-compression cycle includes a first vapor-compression cycle that includes a first heat exchanger, a first refrigerant fluid thermally coupled to the heating fluid in the first heat exchanger, a first compressor fluidly coupled to the first heat exchanger, a second heat exchanger fluidly coupled to the first compressor, and a first expansion device fluidly coupled to the second heat exchanger.

In another aspect combinable with any one of the previous aspects, the at least one vapor-compression cycle includes a second vapor-compression cycle that includes the second heat exchanger, a second refrigerant fluid thermally coupled to the first refrigerant fluid in the second heat exchanger, a second compressor fluidly coupled to the second heat exchanger, a third heat exchanger fluidly coupled to the second compressor, and a second expansion device fluidly coupled to the third heat exchanger.

In another aspect combinable with any one of the previous aspects, the carbon dioxide source material is thermally coupled to the second refrigerant fluid to receive the portion of the thermal energy to separate carbon dioxide from the carbon dioxide source material.

In another aspect combinable with any one of the previous aspects, the portion of the thermal energy includes the portion of the heat from the source of heat from the heating fluid and a heat of compression of the first and second compressors.

In another aspect combinable with any one of the previous aspects, the at least one vapor-compression cycle further includes a third vapor-compression cycle that includes the third heat exchanger, a third refrigerant fluid thermally coupled to the second refrigerant fluid in the third heat exchanger, a third compressor fluidly coupled to the third heat exchanger, a fourth heat exchanger fluidly coupled to the third compressor, and a third expansion device fluidly coupled to the fourth heat exchanger.

In another aspect combinable with any one of the previous aspects, the carbon dioxide source material is thermally coupled to the third refrigerant fluid to receive the portion of the thermal energy to separate carbon dioxide from the carbon dioxide source material.

In another aspect combinable with any one of the previous aspects, the portion of the thermal energy includes the portion of the heat from the source of heat from the heating fluid and a heat of compression of the first, second, and third compressors.

In another aspect combinable with any one of the previous aspects, at least one of the first, second, third, or fourth heat exchangers includes a plate-and-frame heat exchanger.

In another aspect combinable with any one of the previous aspects, at least one of the first, second, or third refrigerant fluids includes 1,1,1,2-Tetrafluoroethane.

In another aspect combinable with any one of the previous aspects, the carbon dioxide source material includes a liquid including atmospheric carbon dioxide.

In another general implementation, a method for providing carbon dioxide includes generating thermal energy, an exhaust fluid, and electrical power from a power plant; providing at least a portion of the exhaust fluid and at least a portion of the generated electrical power to an exhaust fluid scrubbing system to separate components of the portion of the exhaust fluid; capturing heat from a source of heat of an industrial process in a heating fluid, the industrial process electrically coupled to the power plant; transferring at least a portion of the heat of the industrial process captured in the heating fluid to a carbon dioxide source material of a direct air capture (DAC) system; providing at least another portion of the generated electrical power from the power plant to the DAC system; providing the thermal energy from the power plant to the DAC system; and separating, with the transferred portion of the heat of the industrial process and the provided thermal energy, carbon dioxide from the carbon dioxide source material of the DAC system.

In an aspect combinable with the general implementation, the industrial process includes a data center, and the source of heat includes a plurality of data center heat-generating electronic devices.

In another aspect combinable with any one of the previous aspects, the plurality of data center heat-generating electronic devices include a plurality of hardware processors.

In another aspect combinable with any one of the previous aspects, generating electrical power from the power plant includes generating electrical power from a natural gas power plant.

In another aspect combinable with any one of the previous aspects, generating the exhaust fluid includes generating carbon dioxide from combusting natural gas in generating electrical power from the natural gas power plant.

In another aspect combinable with any one of the previous aspects, separating the exhaust fluid into a carbon dioxide fluid stream that includes the carbon dioxide and an effluent fluid stream that is substantially free of the carbon dioxide.

Another aspect combinable with any one of the previous aspects further includes providing at least two of the industrial process, the exhaust fluid scrubbing system, or the DAC system with electrical power of the power plant through at least one switch.

In another aspect combinable with any one of the previous aspects, the at least one switch includes at least one automatic transfer switch.

In another aspect combinable with any one of the previous aspects, the at least two of the industrial process, the exhaust fluid scrubbing system, or the DAC system include the industrial process and the DAC system.

In another aspect combinable with any one of the previous aspects, at least a portion of the electrical power output from the power plant approximates a backup electrical power input of the industrial process.

In another aspect combinable with any one of the previous aspects, a maximum output of the electrical power output from the power plant approximates a backup electrical power input of the industrial process.

Another aspect combinable with any one of the previous aspects further includes transferring at least a portion of the heat from the heating fluid to a refrigerant fluid circulating through at least one thermodynamic cycle of a heating system.

In another aspect combinable with any one of the previous aspects, the refrigerant fluid includes a thermal energy from the portion of the heat from the source of heat in the heating fluid and a heat of compression of the at least one thermodynamic cycle.

In another aspect combinable with any one of the previous aspects, the at least one thermodynamic cycle includes at least one vapor-compression cycle, and the heating system includes a heat-pump system.

In another aspect combinable with any one of the previous aspects, the at least one vapor-compression cycle includes a compressor, a condenser, an evaporator, and an expansion device fluidly coupled in a refrigerant circuit that includes the refrigerant fluid.

In another aspect combinable with any one of the previous aspects, transferring the portion of the heat from the heating fluid to the refrigerant fluid circulating through the at least one vapor-compression cycle of the heat pump system includes transferring the portion of the heat from the heating fluid to a first refrigerant fluid thermally coupled to the heating fluid in a first heat exchanger of a first vapor-compression cycle; compressing the first refrigerant fluid in a first compressor fluidly coupled to the first heat exchanger to add a first heat of compression to the first refrigerant fluid; transferring a thermal energy from the first refrigerant fluid that includes the portion of the heat from the heating fluid and the first heat of compression to a second refrigerant fluid of a second vapor-compression cycle in a second heat exchanger fluidly coupled to the first compressor; and compressing the second refrigerant fluid in a second compressor fluidly coupled to the second heat exchanger to add a second heat of compression to the second refrigerant fluid.

Another aspect combinable with any one of the previous aspects further includes transferring a thermal energy from the second refrigerant fluid that includes the portion of the heat from the heating fluid and the first and second heat of compressions to the carbon dioxide source material of the DAC system.

Another aspect combinable with any one of the previous aspects further includes transferring the thermal energy from the second refrigerant fluid that includes the portion of the heat from the heating fluid and the first and second heat of compression to a third refrigerant fluid of a third vapor-compression cycle in a third heat exchanger fluidly coupled to the second compressor.

Another aspect combinable with any one of the previous aspects further includes compressing the third refrigerant fluid in a third compressor fluidly coupled to the third heat exchanger to add a third heat of compression to the third refrigerant fluid.

Another aspect combinable with any one of the previous aspects further includes transferring a thermal energy from the third refrigerant fluid that includes the portion of the heat from the heating fluid and the first, second, and third heat of compressions to the carbon dioxide source material of the DAC system.

In another aspect combinable with any one of the previous aspects, at least one of the first, second, or third heat exchangers includes a plate-and-frame heat exchanger.

In another aspect combinable with any one of the previous aspects, at least one of the first, second, or third refrigerant fluids includes 1,1,1,2-Tetrafluoroethane.

In another aspect combinable with any one of the previous aspects, the carbon dioxide source material includes a liquid including atmospheric carbon dioxide.

Implementations of methods and systems according to the present disclosure may include one or more of the following features. For example, a power plant designed to provide backup power for an industrial process may be operated more efficiently by powering other processes, including a DAC process during periods that backup power is not needed. As another example, waste heat can be captured from both a power plant and an industrial process and efficiently used in a DAC process. As another example, integrated processes that produce power and capture carbon dioxide using waste heat may also produce potable water. In another example, multiple flows of greenhouse gases may be captured and directed to a revenue-generating process, such as carbon dioxide enhanced oil recovery ($CO_2$-EOR). As yet another example, a carbon dioxide stream may be produced from previously captured atmospheric carbon dioxide with a source of heat that otherwise would be wasted or underutilized. Thus, "free" (or relatively free) energy may be used to separate the captured carbon dioxide into a separate commercial carbon dioxide stream. As yet another example, the separated carbon dioxide stream may be sequestered (e.g., after use as an injectant in hydrocarbon production operations) in a subterranean formation.

Implementations of methods and systems for producing carbon dioxide according to the present disclosure may include one or more of the following features. For example, a carbon dioxide stream may be produced from previously captured atmospheric carbon dioxide with a source of heat that otherwise would be wasted or underutilized. Thus, "free" (or relatively free) energy may be used to separate the captured carbon dioxide into a separate commercial carbon dioxide stream. As yet another example, the separated carbon dioxide stream may be sequestered (e.g., after use as an injectant in hydrocarbon production operations) in a subterranean formation.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1:
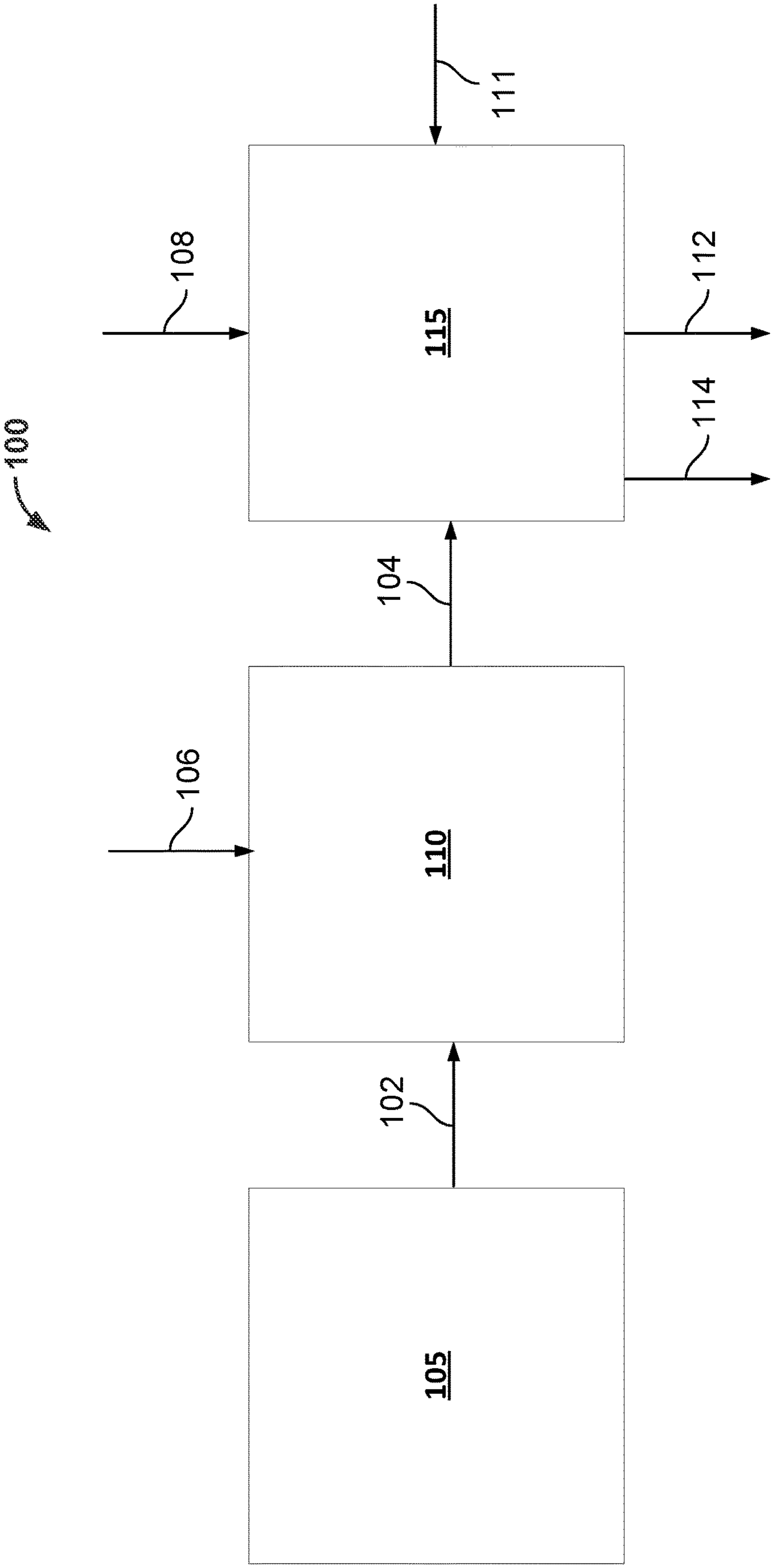
FIG. 1 is a schematic illustration of an example implementation of a carbon dioxide production system according to the present disclosure.

FIG. 1 is a schematic illustration of an example implementation of a carbon dioxide production system 100 according to the present disclosure. As illustrated, the carbon dioxide production system 100 includes an industrial process 105 that generates waste heat 102. The waste heat 102 is supplied, in this example, to a heat pump system 110 that also utilizes a power input 106. The heat pump system 110 provides a heated fluid 104 to a carbon dioxide direct air capture (DAC) system 115. The carbon dioxide DAC system 115 also receives a power input 108 and an ambient airflow input 111. The carbon dioxide DAC system 115 outputs a carbon dioxide supply stream 112 and a carbon dioxide-reduced airflow output stream 114.

Generally, the carbon dioxide production system 100 operates to capture the waste heat 102, generate the heated fluid 104 that has a thermal energy that includes the waste heat 102, as well as heat of compression from the heat pump system 110, and utilize such thermal energy in the heated fluid 104 to separate carbon dioxide captured from the ambient airflow input 111 to supply the separated carbon dioxide as the carbon dioxide supply stream 112. In some aspects, the carbon dioxide supply stream 112 can be provided as an injectant into a subterranean formation during hydrocarbon production operations. In some aspects, the injected carbon dioxide may be sequestered in the subterranean formation (with or without assisting in the hydrocarbon production operations).

In the present disclosure, the industrial process 105 may be any process that generates, as an output, thermal energy in the form of waste heat, i.e., energy that, unless captured, would otherwise would be lost to, e.g., the ambient environment. As an example, the industrial process 105 may be a computer data center that, generally, operates house computer systems and associated components, such as telecommunications and storage systems. In some aspects, a data center includes tens, hundreds, thousands, or even more server devices that generate heat, such as hardware processors, voltage regulators, memory modules, switches, and other devices that operate to provide a particular amount of information technology (IT) power. Such devices, typically, utilize electrical power to operate and output heat during operation. In order for such devices to operate correctly, the output heat must be captured in a cooling fluid flow (e.g., air, water, refrigerant) and expelled from the data center. For instance, air handling system (e.g., fans, cooling coils) may operate to capture the output heat in an airflow circulated over the heat-generating components. The output heat now within the airflow is transferred to a cooling liquid, e.g., within a cooling coil. The heat transferred to the cooling liquid is then typically rejected to the ambient environment as waste heat, such as through evaporative cooling systems, chiller/cooling tower systems, or otherwise. In this example, this waste heat takes the form of waste heat 102.

The example heat pump system 110 utilizes the waste heat 102 and power input 108 to provide the heated fluid 104. Generally, the heat pump system 110 includes one or more vapor-compression cycles ("heat pumps") to add thermal energy in the form of heat of compression to the waste heat 102 and transfer the sum of such energy to a fluid to generate the heated fluid 104 (e.g., a heated liquid). Generally, each heat pump within the heat pump system 110 operates to transfer thermal energy from a heat sink to a heat source, i.e., in an opposite direction of spontaneous heat transfer. The one or more heat pumps of the heat pump system 110 use the power input 106 to accomplish the work of transferring energy from the heat source to the heat sink. Each heat pump in the heat pump system 110 includes the primary components of two heat exchangers (one acting as an evaporator, one acting as a condenser), an expansion device (e.g., valve or fixed orifice), and a compressor (e.g., centrifugal, screw, reciprocating, scroll, or otherwise). Each of these components are fluidly coupled within a closed-loop refrigerant circuit in the heat pump.

As is generally known, in a vapor-compression heat pump cycle, a refrigerant exits a first heat exchanger in which heat from the refrigerant is released to a first medium. The refrigerant then enters a compressor in which it is compressed and a heat of compression is added thereto. The refrigerant then enters a second heat exchanger in which heat from a second medium is added. The refrigerant then enters an expansion device and undergoes an isenthalpic pressure drop. The refrigerant completes the cycle by entering the evaporator to release the heat of compression and the heat from the second medium to the first medium.

Although the present disclosure describes a vapor-compression heat pump cycle as a heat transfer system between a source of waste heat and a carbon dioxide DAC system, other thermodynamic cycles may also be used in place of (or along with) the described vapor-compression heat pump cycle. For example, one or more vapor-adsorption cycles may be used in place of (or along with) the described vapor-compression heat pump cycle. A vapor-adsorption cycle, for example, consists of a cycle of desorption-condensation-expansion-evaporation, followed by adsorption.

The carbon dioxide DAC system 115, generally, operates to pass the ambient airflow input 111 (which includes gaseous carbon dioxide) over or through one or more media (e.g., "filters"). In some aspects, one or more fans (not shown) utilize the power input 108 to circulate the ambient airflow input 111. The media or filter, in some aspects, includes a solid adsorbent to which the atmospheric carbon dioxide in the airflow input 111 bonds. Alternatively, a liquid adsorbent may be also passed over the media or filter to which the atmospheric carbon dioxide in the airflow input 111 bonds. The adsorbent (solid or liquid) that is saturated with carbon dioxide may be referred to as "rich adsorbent."

In some aspects, for example, if liquid adsorbent is used, such liquid has a high affinity for carbon dioxide and is circulated over a non-reactive metal (or other material) filter. Once saturated with carbon dioxide, the liquid can be heated (e.g., to 800° C.) to release the carbon dioxide (as described below). The liquid can then be reused to capture more carbon dioxide in a continual cycle.

In the case of a solid sorbent, as the airflow input 111 passes over the solid media or filter, atmospheric carbon dioxide within the airflow input 111 bonds to the media or filter. When the media or filter is saturated with carbon dioxide, it can be heated (e.g., to 100-120° C.) to release the carbon dioxide for collection (as described below).

Using thermal energy from the heated fluid 104, heat is applied to the solid or liquid adsorbent, which dissolves the bonds between the carbon dioxide and the sorbent. The separated carbon dioxide is provided as the carbon dioxide supply stream 112 from the carbon dioxide DAC system 115. The now-"lean adsorbent" that is carbon dioxide free (i.e., the solid or liquid) is recycled back to capture more carbon dioxide from the ambient airflow input 111. The airflow output 114, typically, contains little to no carbon dioxide.

Figure 2:
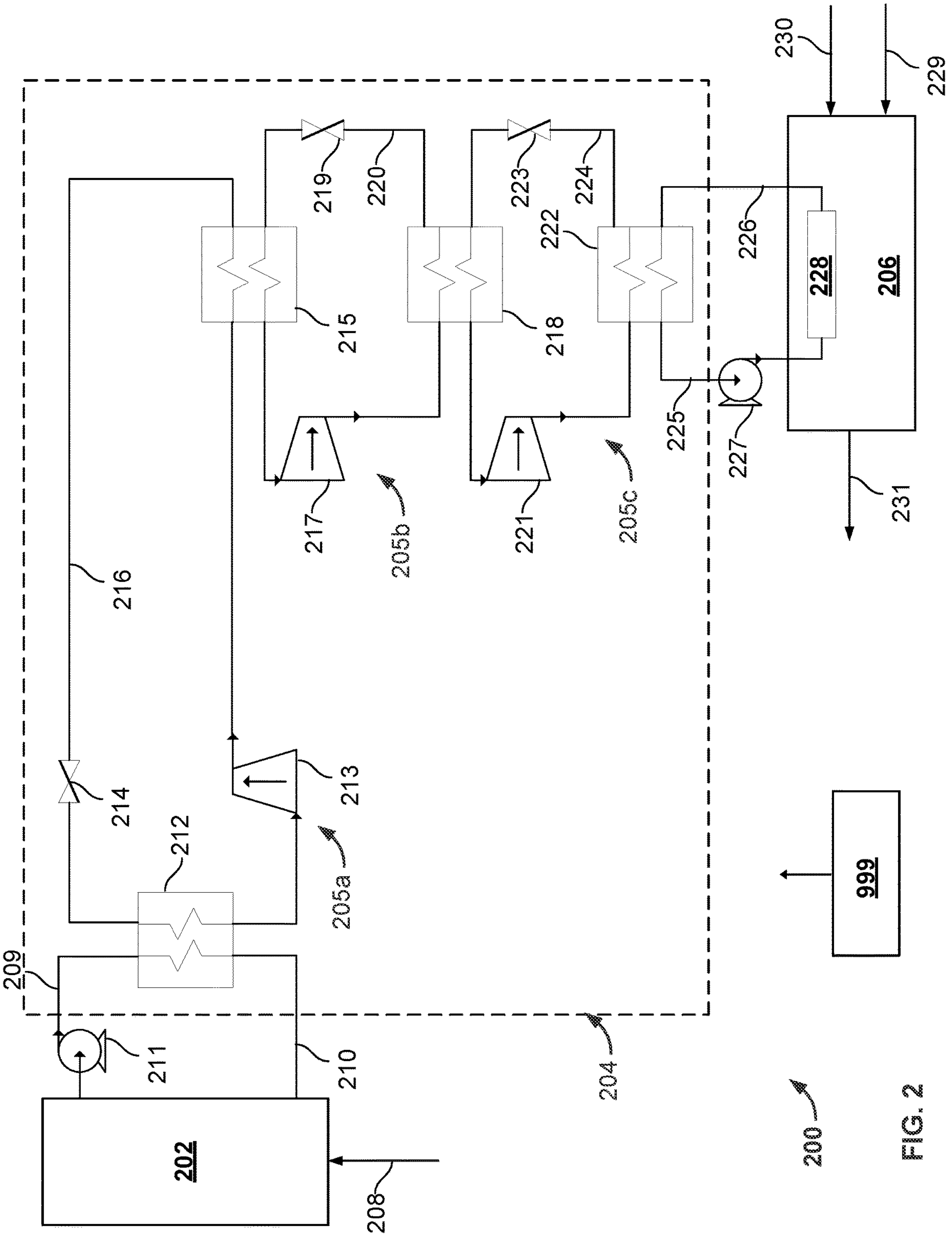
FIG. 2 is a schematic illustration of another example implementation of a carbon dioxide production system according to the present disclosure.

FIG. 2 is a schematic illustration of another example implementation of a carbon dioxide production system 200 according to the present disclosure. Like the carbon dioxide production system 100, the system 200 includes an industrial process in the form of data center 202 (which may represent one or more data centers). Also like carbon dioxide production system 100, the system 200 includes a heat pump system 204 (shown encompassed with a dotted line) and a carbon dioxide DAC system 206. In this example, the heat pump system 204 includes three heat pumps 205*a-c* (also referred to as vapor-compression cycles 205*a-c*). The present disclosure contemplates that more than three heat pumps or fewer than three heat pumps may be utilized in the heat pump system 204. In some aspects, the number (or size, or both) of the heat pumps within the heat pump system 204 may depend on, for example, a required or desired temperature of a heated supply liquid 225 that is provided from the heat pump system 204 to a carbon dioxide source material 228 (e.g., solid or liquid) in the carbon dioxide DAC system 206 relative to a temperature of a heated supply fluid 209 output from the data center 202. For example, the greater the temperature difference between the heated supply liquid 225 and the heated supply fluid 209, the more (or larger) heat pumps within the heat pump system 204 are necessary. Conversely, the lesser the temperature difference between the heated supply liquid 225 and the heated supply fluid 209, the fewer (or smaller) heat pumps within the heat pump system 204 are necessary.

Data center 202 receives a power input 208 to operate heat-generating electronic devices, such as processors, network switches, and other devices necessary to provide IT power. The heated supply fluid 209 captures heat from the data center 202 (from the devices and otherwise) and is circulated, by pump 211, to a heat exchanger 212 that is part of heat pump 205*a*. A heated return fluid 210 is returned (at a lower temperature than supply fluid 209) to the data center 202 and additional heat from data center 202 may be captured in a continual cycle.

Each of the illustrated heat pumps 205*a-c* include two heat exchangers (each of which may represent one or more heat exchangers coupled in parallel or series), a compressor (which may represent one or more compressors), and an expansion device (which may represent one or more expansion devices). These components are fluidly coupled within a closed refrigerant circuit through which a refrigerant (e.g., water, ammonia, HCFC, or HCF such as 1,1,1,2-Tetrafluoroethane commonly called R-134a) circulates in a vapor-compression cycle.

For example, heat pump 205*a* includes refrigerant circuit 216, heat exchanger 212, compressor 213, heat exchanger 215, and expansion device 214. Refrigerant in the refrigerant circuit 216 of the heat pump 205*a* is thermally coupled to the heated supply fluid 209 in heat exchanger 212. Continuing, heat pump 205*b* includes refrigerant circuit 220, heat exchanger 215, compressor 217, heat exchanger 218, and expansion device 219. Refrigerant in the refrigerant circuit 220 of heat pump 205*b* is thermally coupled to the refrigerant in circuit 216 of heat pump 205*a* in heat exchanger 215. Finally, heat pump 205*c* includes refrigerant circuit 224, heat exchanger 218, compressor 221, heat exchanger 222, and expansion device 223. Refrigerant in the refrigerant circuit 224 of heat pump 205*c* is thermally coupled to the refrigerant in circuit 220 of heat pump 205*b* in heat exchanger 218. Also, refrigerant in the refrigerant circuit 224 of heat pump 205*c* is thermally coupled to the heated supply liquid 225 in heat exchanger 222.

In this example, therefore, multiple (three) heat pumps are thermally coupled in series in order to (1) transfer heat from a waste heat source of the data center 202 to the carbon dioxide DAC system 206; and (2) add thermal energy (heat) in steps to the transferred heat of (1) in several steps corresponding to the number of heat pumps in the heat pump system 204. The added heat in steps is transferred through the thermal coupling of the refrigerant circuits in the heat pumps in heat exchangers. As noted also in this disclosure, although multiple (in this example, three) heat pumps are thermally coupled, more or fewer may be used (e.g., based on a difference between a desired fluid temperature of the DAC system and a waste heat temperature).

In this example, the heated supply liquid 225 (which alternatively may be a vapor or gas or mixed phase fluid) is circulated by pump 227 to the carbon dioxide source material 228. Heat from the heated supply liquid 225 is provided to the carbon dioxide source material 228 such that a heated return liquid 226 is returned (at a lower temperature than supply liquid 225) to the heat exchanger 222. An airflow input 230 that includes atmospheric carbon dioxide is circulated, e.g., by fans powered by power input 229, to the carbon dioxide source material 228, in which the carbon dioxide from the input 230 is adsorbed (in a solid sorbent or liquid sorbent, or both). A carbon dioxide output 231 is produced by separating the carbon dioxide from the carbon dioxide source material 228 through a heating process with heat supplied by heated supply liquid 225.

In an example operation of carbon dioxide production system 200, heat from the data center 202 is transferred to the refrigerant circuit 216 of heat pump 205*a* via heated supply fluid 209 in heat exchanger 212. In some aspects, heated supply fluid 209 is between about 35-50° C. and heated return fluid 210 is between about 20-35° C.

Next, heat of compression from compressor 213 is added to the refrigerant circuit 216 to combine with the heat from data center 202. The combined heat (e.g., thermal energy) of the refrigerant circuit 216 is transferred to the refrigerant circuit 220 in heat exchanger 215. In some aspects, the refrigerant circuit 216 enters the heat exchanger 212 between about 35-50° C. and enters the heat exchanger 215 between about 50-65° C.

Next, heat of compression from compressor 217 is added to the refrigerant circuit 220 to combine with the heat from data center 202 and heat of compression of compressor 213. The combined heat (e.g., thermal energy) of the refrigerant circuit 220 is transferred to the refrigerant circuit 224 in heat exchanger 218. In some aspects, the refrigerant circuit 220 enters the heat exchanger 215 between about 50-65° C. and enters the heat exchanger 218 between about 80-95° C.

Next, heat of compression from compressor 221 is added to the refrigerant circuit 224 to combine with the heat from data center 202 and heat of compression of compressors 213 and 217. The combined heat (e.g., thermal energy) of the refrigerant circuit 224 is transferred to the heated supply liquid 225 in heat exchanger 222. In some aspects, the refrigerant circuit 224 enters the heat exchanger 218 between about 65-80° C. and enters the heat exchanger 222 at about or more than 95° C. Heated supply liquid 225 may exit the heat exchanger 222 and enter the carbon dioxide source material 228 at greater than 95° C.

Alternative implementations of carbon dioxide production system 200 may include additional or fewer components. For example, in some aspects, one or more dry coolers may be added to or a part of the carbon dioxide DAC system 206 and a flow of one or more of the illustrated heated refrigerants of the heat pump system 204 may be circulated to the dry coolers. Thus, heat not used to separate the carbon dioxide from the carbon dioxide source material 228 may be transferred to an ambient environment through the one or more dry coolers.

As another example alternative implementation, one or more evaporative coolers may be added to be in fluid communication with the data center 202 and coupled in parallel to the heat exchanger 212. Thus, in some aspects, the heated supply fluid 209 may be diverted to the one or more evaporative coolers, e.g., in the event of a failure of the heat pump system 204 or otherwise.

As yet another example, in some example implementations, the heat pump system 204 may be removed from the carbon dioxide production system 200 and heated supply fluid 209 may be circulated directly to the heat exchanger 222 to heat the heated supply liquid 225. In such examples, a temperature of the heated supply fluid 209 may be great enough to heat the heated supply liquid 225 to a temperature sufficient to break the bonds that connect the captured carbon dioxide in the carbon dioxide source material 228 from the solid or liquid sorbent.

Each of the configurations described and shown in this disclosure may include process streams (e.g., refrigerants, liquids, fluids) within a system for capturing carbon dioxide from gaseous sources, including dilute sources such as the atmosphere, and then separating the captured carbon dioxide with thermal energy from waste heat. The process streams can be flowed using one or more flow control systems implemented throughout the system. A flow control system can include one or more flow pumps to pump the process streams, one or more fans or blowers to move gaseous process streams, one or more flow pipes through which the process streams are flowed and one or more valves to regulate the flow of streams through the pipes.

In some implementations, a flow control system can be operated manually. For example, an operator can set a flow rate for each pump and set valve open or close positions to regulate the flow of the process streams through the pipes in the flow control system. Once the operator has set the flow rates and the valve open or close positions for all flow control systems distributed across the system for converting calcium oxide to calcium hydroxide, the flow control system can flow the streams under constant flow conditions, for example, constant volumetric rate or other flow conditions. To change the flow conditions, the operator can manually operate the flow control system, for example, by changing the pump flow rate or the valve open or close position.

In some implementations, a flow control system can be operated automatically. For example, the flow control system can be connected to a computer or control system (e.g., a control system 999 communicably coupled to all or some of the described components of either of system 100 or system 200) to operate the flow control system. The control system 999 can include a computer-readable medium storing instructions (such as flow control instructions and other instructions) executable by one or more processors to perform operations (such as flow control operations). An operator can set the flow rates and the valve open or close positions for all flow control systems distributed across the facility using the control system. In such implementations, the operator can manually change the flow conditions by providing inputs through the control system 999. Also, in such implementations, the control system 999 can automatically (that is, without manual intervention) control one or more of the flow control systems, for example, using feedback systems connected to the control system 999. For example, a sensor (such as a pressure sensor, temperature sensor or other sensor) can be connected to a pipe through which a process stream flows. The sensor can monitor and provide a flow condition (such as a pressure, temperature, or other flow condition) of the process stream to the control system 999. In response to the flow condition exceeding a threshold (such as a threshold pressure value, a threshold temperature value, or other threshold value), the control system 999 can automatically perform operations. For example, if the pressure or temperature in the pipe exceeds the threshold pressure value or the threshold temperature value, respectively, the control system 999 can provide a signal to the pump to decrease a flow rate, a signal to open a valve to relieve the pressure, a signal to shut down process stream flow, or other signals.

Figure 3:
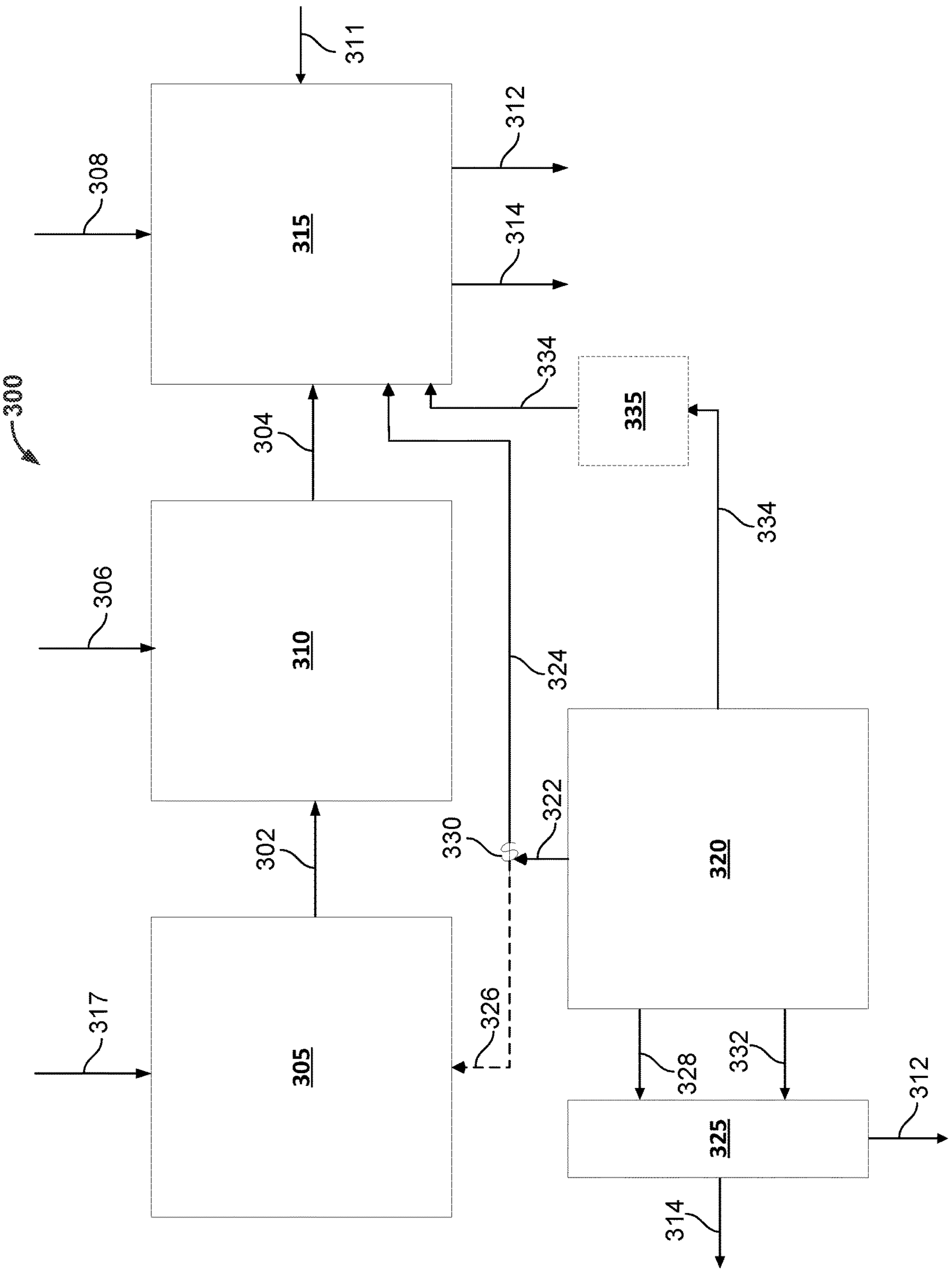
FIG. 3 is a schematic illustration of an example implementation of an integrated power and carbon dioxide production system according to the present disclosure.

FIG. 3 is a schematic illustration of an example implementation of an integrated power and carbon dioxide production system ("integrated system) 300 according to the present disclosure. As illustrated, the integrated system 300 includes an industrial process 305 that generates waste heat 302. The waste heat 302 is supplied, in this example, to a heat pump system 310 that also utilizes a power input 306. The heat pump system 310 provides a heated fluid 304 to a carbon dioxide direct air capture (DAC) system 315. The carbon dioxide DAC system 315 also receives a power input 308 and an ambient airflow input 311. The carbon dioxide DAC system 315 outputs a carbon dioxide supply stream 312 and a carbon dioxide-reduced airflow output stream 314.

Generally, the integrated system 300 operates to capture the waste heat 302, generate the heated fluid 304 that has a thermal energy that includes the waste heat 302, as well as heat of compression from the heat pump system 310, and utilize such thermal energy in the heated fluid 304 to separate carbon dioxide captured from the ambient airflow input 311 to supply the separated carbon dioxide as the carbon dioxide supply stream 312. In some aspects, the carbon dioxide supply stream 312 can be provided as an injectant into a subterranean formation during hydrocarbon production operations. In some aspects, the injected carbon dioxide may be sequestered in the subterranean formation (with or without assisting in the hydrocarbon production operations).

In the present disclosure, the industrial process 305 may be any process that generates, as an output, thermal energy in the form of waste heat, i.e., energy that, unless captured, would otherwise would be lost to, e.g., the ambient environment. As an example, the industrial process 305 may be a computer data center that, generally, operates computer systems and associated components, such as telecommunications and storage systems. In some aspects, a data center includes tens, hundreds, thousands, or even more server devices that generate heat, such as hardware processors, voltage regulators, memory modules, switches, and other devices that operate to provide a particular amount of information technology (IT) power. Such devices, typically, utilize electrical power to operate and output heat during operation. In order for such devices to operate correctly, the output heat must be captured in a cooling fluid flow (e.g., air, water, refrigerant) and expelled from the data center. For instance, an air handling system (e.g., fans, cooling coils) may operate to capture the output heat in an airflow circulated over the heat-generating components. The output heat now within the airflow is transferred to a cooling liquid, e.g., within a cooling coil. The heat transferred to the cooling liquid is then typically rejected to the ambient environment as waste heat, such as through evaporative cooling systems, chiller/cooling tower systems, or otherwise. In this example, this waste heat takes the form of waste heat 302.

The example heat pump system 310 utilizes the waste heat 302 and power input 306 to provide the heated fluid 304. Generally, the heat pump system 310 includes one or more vapor-compression cycles ("heat pumps") to add thermal energy in the form of heat of compression to the waste heat 302 and transfer the sum of such energy to a fluid to generate the heated fluid 304 (e.g., a heated liquid). Generally, each heat pump within the heat pump system 310 operates to transfer thermal energy from a heat sink to a heat source, i.e., in an opposite direction of spontaneous heat transfer. The one or more heat pumps of the heat pump system 310 use the power input 306 to accomplish the work of transferring energy from the heat source to the heat sink. Each heat pump in the heat pump system 310 includes the primary components of two heat exchangers (one acting as an evaporator, one acting as a condenser), an expansion device (e.g., valve or fixed orifice), and a compressor (e.g., centrifugal, screw, reciprocating, scroll, or otherwise). Each of these components are fluidly coupled within a closed-loop refrigerant circuit in the heat pump.

As is generally known, in a vapor-compression heat pump cycle, a refrigerant exits a first heat exchanger in which heat from the refrigerant is released to a first medium. The refrigerant then enters a compressor in which it is compressed and a heat of compression is added thereto. The refrigerant then enters a second heat exchanger in which heat from a second medium is added. The refrigerant then enters an expansion device and undergoes an isenthalpic pressure drop. The refrigerant completes the cycle by entering the evaporator to release the heat of compression and the heat from the second medium to the first medium.

Although the present disclosure describes a vapor-compression heat pump cycle as a heat transfer system between a source of waste heat and a carbon dioxide DAC system, other thermodynamic cycles may also be used in place of (or along with) the described vapor-compression heat pump cycle. For example, one or more vapor-adsorption cycles may be used in place of (or along with) the described vapor-compression heat pump cycle. A vapor-adsorption cycle, for example, consists of a cycle of desorption-condensation-expansion-evaporation, followed by adsorption.

The carbon dioxide DAC system 315, generally, operates to pass the ambient airflow input 311 (which includes gaseous carbon dioxide) over or through one or more media (e.g., "filters"). In some aspects, one or more fans (not shown) utilize the power input 308 to circulate the ambient airflow input 311. The media or filter, in some aspects, includes a solid adsorbent to which the atmospheric carbon dioxide in the airflow input 311 bonds. Alternatively, a liquid adsorbent may be also passed over the media or filter to which the atmospheric carbon dioxide in the airflow input 311 bonds. The adsorbent (solid or liquid) that is saturated with carbon dioxide may be referred to as "rich adsorbent."

In some aspects, for example, if liquid adsorbent is used, such liquid has a high affinity for carbon dioxide and is circulated over a non-reactive metal (or other material) filter. Once saturated with carbon dioxide, the liquid can be heated (e.g., to 800° C.) to release the carbon dioxide (as described below). The liquid can then be reused to capture more carbon dioxide in a continual cycle.

In the case of a solid sorbent, as the airflow input 311 passes over the solid media or filter, atmospheric carbon dioxide within the input 311 bonds to the media or filter. When the media or filter is saturated with carbon dioxide, it can be heated (e.g., to 100-120° C.) to release the carbon dioxide for collection (as described below).

Using thermal energy from the heated fluid 304, heat is applied to the solid or liquid adsorbent, which dissolves the bonds between the carbon dioxide and the sorbent. The separated carbon dioxide is provided as the carbon dioxide output stream 312 from the carbon dioxide DAC system 315. The now-"lean adsorbent" that is carbon dioxide free (i.e., the solid or liquid) is recycled back to capture more carbon dioxide from the ambient airflow input 311. The airflow output 314, typically, contains little to no carbon dioxide.

As further shown in the example embodiment of FIG. 3, the integrated system 300 includes a power plant 320 and a scrubbing system 325. As shown in this example, the power plant 320 may provide waste heat 302 (e.g., as generated through the generation of electrical power by the power plant 320) to the DAC system 315. In this example, the power plant 320 also generates electrical power 322 and 328. In some aspects, as shown, the electrical power 322 goes through one or more switches 330 (shown here as one, but more are possible) to provide electrical power 324 to the DAC system 315 and backup electrical power 326 to the industrial process 305.

As shown in this example, the power output of the power plant 320 may be sized to provide a sum of the electrical power 324 to the DAC system 315 and the electrical power 328 to the scrubbing system 325 for normal operation, as well as the backup electrical power 326 to the industrial process 305 when needed (i.e., when the industrial process 305 loses or cannot use grid electrical power 317). Thus, in some aspects, when the industrial process 305 needs the backup electrical power 326, electrical power 328 and electrical power 324 are still provided to their respective users. Alternatively, in some aspects, the power output of the power plant 320 may be sized to provide a sum of the electrical power 324 to the DAC system 315 and the electrical power 328 to the scrubbing system 325 for normal operation, as well as the backup electrical power 326 to the industrial process 305 when needed (i.e., when the industrial process 305 loses or cannot use grid electrical power 317), as well as one or both of power inputs 306 or 308.

Alternatively, in some aspects, the power output of the power plant 320 may be sized only to provide the backup electrical power 326 to the industrial process 305 when needed (i.e., when the industrial process 305 loses or cannot use grid electrical power 317). Thus, during operational periods when the industrial process 305 does not need backup electrical power 326, the electrical power 328 and/or the electrical power 324 (as well as other power inputs) may be provided by the power plant 320. During operational periods when the industrial process 305 does need backup electrical power 326, the electrical power 328 and/or the electrical power 324 (as well as other power inputs) may not be provided by the power plant 320. For example, electrical power 322 may be routed, in such operational periods, through the switch 330 as backup electrical power 326.

In some aspects, the electrical power 326 supplied from the power plant 320 to the industrial process 305 may not be "backup" power but instead may be a primary power source for the industrial process 305. For example, in some aspects, the power plant 320 may be sized to provide primary electrical power 326 to the industrial process 305, as well as, in some aspects, one or more other components shown in the integrated system 300.

As further shown in FIG. 3, in some aspects, thermal energy (heat) 334 that is generated from the generation of electrical power by the power plant 320 may be provided (e.g., in a heated fluid or otherwise) to the DAC system 315. In some aspects, the thermal energy 334 may be combined with, or used in place of, the heated fluid 304 that is provided to the DAC system 315 from the heat pump system 310 (or directly as a heated fluid from the waste heat 302 from the industrial process 305).

In some aspects, the thermal energy 334 may be routed directly to the DAC system 315, e.g., with little to no purposeful temperature change to the thermal energy 334. For instance, in such cases where a temperature of the thermal energy 334 from the power plant 320 is appropriate (e.g., at a temperature or within a temperature range) for the dissolution of the bonds between the carbon dioxide and the sorbent in the DAC system 315, then direct routing of the thermal energy 334 to the DAC system 315 may be appropriate. Alternatively, the thermal energy 334 may be routed first to a heating or cooling system 335 in order to increase (or decrease) a temperature of the thermal energy 334 prior to being used by the DAC system 315. For example, as a heating system 335, the system 335 may be similar to the heat pump system 310. As a cooling system 335, the system 335 may, for example, reduce a temperature of the thermal energy 334 by first using the thermal energy 334 to power one or more absorption chillers.

As shown in this example implementation, the scrubbing system 325 also receives an exhaust fluid 332 from the power plant 320. For example, in some aspects, the power plant 320 may be a natural gas power plant in which natural gas is combusted to drive electrical power generation equipment that operates to generate the electrical power shown in FIG. 3. In other aspects, the power plant 320 may use other carbon-based fuel rather than natural gas. In still other aspects, the power plant 320 may use non-carbon based fuels to generate electrical power (e.g., geothermal, solar, and other). For a natural gas power plant 320, although not shown specifically here, such equipment may include, for example, a compressor rotatably coupled to a gas turbine that drives the compressor. The gas turbine receives combustion products fluid from a combustion chamber that receives compressed natural gas from the compressor. The combustion products fluid drives the gas turbine, which in turn is coupled to and drives a generator to produce electrical power.

Output from such a gas turbine (at a lower pressure than the combustion products fluid) is exhaust fluid 332 (e.g., as a flue gas). A difference in pressure between the combustion products fluid and the exhaust fluid 332 drives the gas turbine to produce electrical power from the generator. As shown in this example, the exhaust fluid 332 is separated by the scrubbing system 325 into multiple output streams. For example, similar to the DAC system 315, outputs of a carbon dioxide supply stream 312 and a carbon dioxide-reduced airflow output stream 314 may be output from the scrubbing system 325.

In some aspects, the carbon dioxide supply streams 312 may be sold (e.g., for $CO_2$-EOR, sequestration, and/or other processes). For example, the carbon dioxide supply streams 312 may generate revenue through emissions credits and federal tax credits. In some aspects, such revenue may offset capital and/or operations costs of the DAC system 315, the power plant 320, both, or other components of the system 300.

The integrated system 300 may advantageously utilize the power plant 320, which may normally be sitting idle, to produce a saleable product in the carbon dioxide fluid streams 312, which also provide environmental benefits. Additionally, in the event of a power outage at the industrial process 305, the power plant 320 would already be running, meaning the delay between the outage and providing the process 305 with power would be reduced. Further, by using the thermal energy 302 and 334, operating costs of the DAC system 315 may be significantly reduced, allowing for the carbon dioxide captured to finance the construction of the DAC system 315 as well as help subsidize the cost of the industrial process's backup power. In addition, the integrated system 300 may produce water from ambient humidity as the DAC system 315 pulls carbon dioxide from the air. The water can be sold or used, e.g., at the industrial process 305.

Figure 4A:
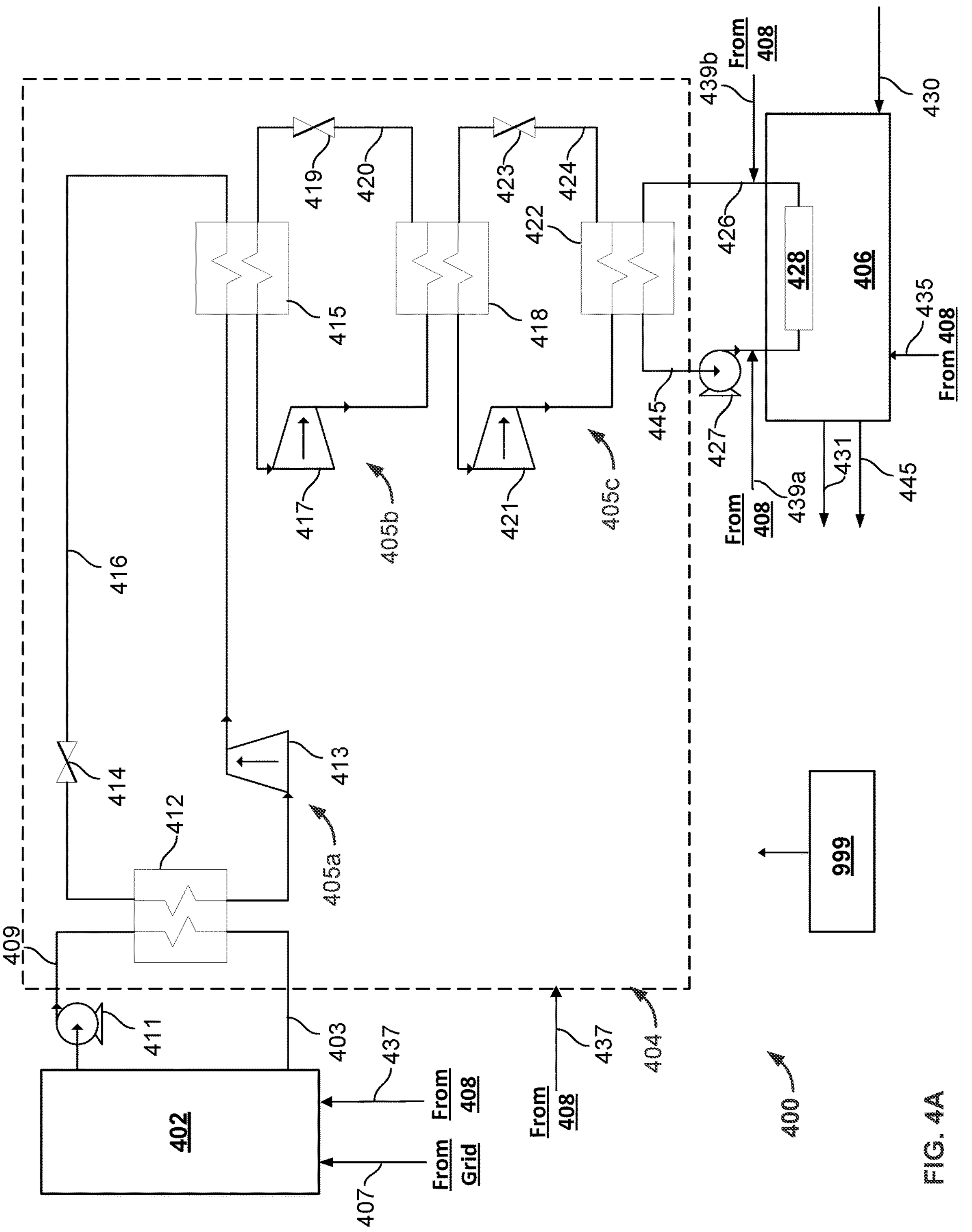
FIGS. 4A-4B are schematic illustrations of another example implementation of an integrated power and carbon dioxide production system according to the present disclosure.
Figure 4B:
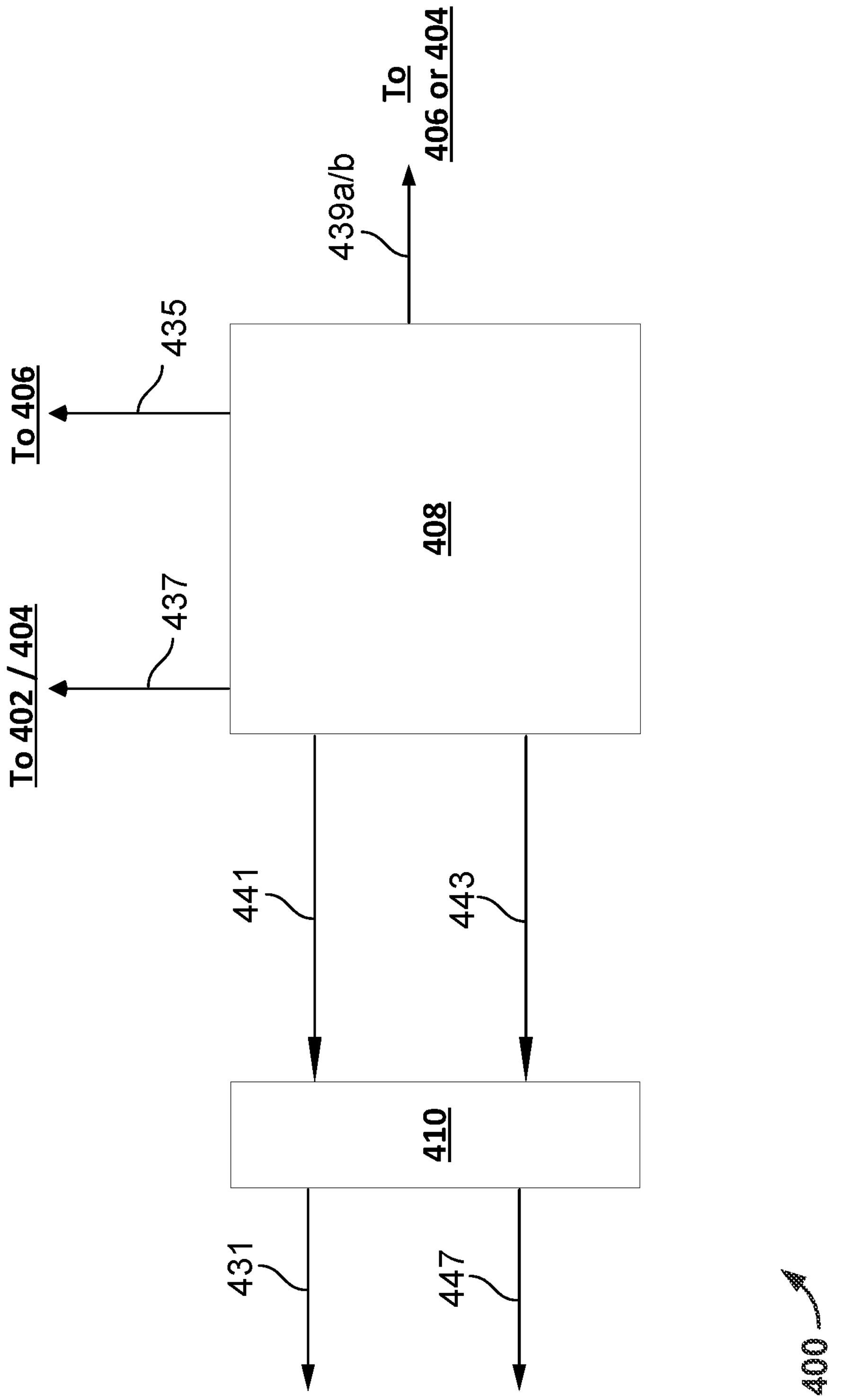

FIGS. 4A-4B are a schematic illustration of another example implementation of an integrated power and carbon dioxide production system ("integrated system") 400 according to the present disclosure. In this example, the system 400 includes an industrial process in the form of data center 402 (which may represent one or more data centers). Also like the integrated system 300, the system 400 includes a heat pump system 404 (shown encompassed with a dotted line) and a carbon dioxide DAC system 406. The example integrated system 400 also includes, as shown on FIG. 4B, a power plant 408 and scrubbing system 410.

In this example, the heat pump system 404 includes three heat pumps 405*a-c* (also referred to as vapor-compression cycles 405*a-c*). The present disclosure contemplates that more than three heat pumps or fewer than three heat pumps may be utilized in the heat pump system 404. In some aspects, the number (or size, or both) of the heat pumps within the heat pump system 404 may depend on, for example, a required or desired temperature of a heated supply liquid 425 that is provided from the heat pump system 404 to a carbon dioxide source material 428 (e.g., solid or liquid) in the carbon dioxide DAC system 406 relative to a temperature of a heated supply fluid 409 output from the data center 402. For example, the greater the temperature difference between the heated supply liquid 425 and the heated supply fluid 409, the more (or larger) heat pumps within the heat pump system 404 are necessary. Conversely, the lesser the temperature difference between the heated supply liquid 425 and the heated supply fluid 409, the fewer (or smaller) heat pumps within the heat pump system 404 are necessary.

Data center 402 receives a power input (e.g., power input 407 or power input 437 from a power plant 408, or both) to operate heat-generating electronic devices, such as processors, network switches, and other devices necessary to provide IT power. The heated supply fluid 409 captures heat from the data center 402 (from the devices and otherwise) and is circulated, by pump 411, to a heat exchanger 412 that is part of heat pump 405*a*. A heated return fluid 403 is returned (at a lower temperature than supply fluid 409) to the data center 402 and additional heat from data center 402 may be captured in a continual cycle.

Each of the illustrated heat pumps 405*a-c* include two heat exchangers (each of which may represent one or more heat exchangers coupled in parallel or series), a compressor (which may represent one or more compressors), and an expansion device (which may represent one or more expansion devices). These components are fluidly coupled within a closed refrigerant circuit through which a refrigerant (e.g., water, ammonia, HCFC, or HCF such as 1,1,1,2-Tetrafluorocthane commonly called R-134a) circulates in a vapor-compression cycle.

For example, heat pump 405*a* includes refrigerant circuit 416, heat exchanger 412, compressor 413, heat exchanger

415, and expansion device 414. Refrigerant in the refrigerant circuit 416 of the heat pump 405*a* is thermally coupled to the heated supply fluid 409 in heat exchanger 412. Continuing, heat pump 405*b* includes refrigerant circuit 420, heat exchanger 415, compressor 417, heat exchanger 418, and expansion device 419. Refrigerant in the refrigerant circuit 420 of heat pump 405*b* is thermally coupled to the refrigerant in circuit 416 of heat pump 405*a* in heat exchanger 415. Finally, heat pump 405*c* includes refrigerant circuit 424, heat exchanger 418, compressor 421, heat exchanger 422, and expansion device 423. Refrigerant in the refrigerant circuit 424 of heat pump 405*c* is thermally coupled to the refrigerant in circuit 420 of heat pump 405*b* in heat exchanger 418. Also, refrigerant in the refrigerant circuit 424 of heat pump 405*c* is thermally coupled to the heated supply liquid 425 in heat exchanger 422.

In this example, therefore, multiple (three) heat pumps are thermally coupled in series in order to (1) transfer heat from a waste heat source of the data center 402 to the carbon dioxide DAC system 406; and (2) add thermal energy (heat) in steps to the transferred heat of (1) in several steps corresponding to the number of heat pumps in the heat pump system 404. The added heat in steps is transferred through the thermal coupling of the refrigerant circuits in the heat pumps in heat exchangers. As noted also in this disclosure, although multiple (in this example, three) heat pumps are thermally coupled, more or fewer may be used (e.g., based on a difference between a desired fluid temperature of the DAC system and a waste heat temperature).

In this example, the heated supply liquid 425 (which alternatively may be a vapor or gas or mixed phase fluid) is circulated by pump 427 to the carbon dioxide source material 428. Heat from the heated supply liquid 425 is provided to the carbon dioxide source material 428 such that a heated return liquid 426 is returned (at a lower temperature than supply liquid 425) to the heat exchanger 422. An airflow input 430 that includes atmospheric carbon dioxide is circulated, e.g., by fans powered by power input 429, to the carbon dioxide source material 428, in which the carbon dioxide from the input 430 is adsorbed (in a solid sorbent or liquid sorbent, or both). A carbon dioxide output 431 is produced by separating the carbon dioxide from the carbon dioxide source material 428 through a heating process with heat supplied by heated supply liquid 425. A carbon dioxide free output 445 (e.g., a fluid output that from which carbon dioxide is removed) is also output from the DAC system 406

As further shown in the example embodiment of FIGS. 4A-4B, the integrated system 400 includes a power plant 408 and a scrubbing system 410. As shown in this example, the power plant 408 may provide waste heat 439*a* and/or 439*b* (e.g., as generated through the generation of electrical power by the power plant 408) to the DAC system 406. In this example, the power plant 408 also generates electrical power 435, 437, and 443. In some aspects, as shown, the electrical power 435 is directed to the DAC system 406 to provide power to that system. The electrical power 437 may be provided to the data center 402, the heat pump system 404, or both. In some aspects, the electrical power 437 provided to the data center 402 may be backup power that operates the data center 402 (e.g., the servers and other heat-generating electronic equipment, as well as auxiliary data center equipment) when electrical power 407 from the grid is interrupted. In other aspects, the electrical power 437 provided to the data center 402 is primary power that operates the data center 402 (e.g., the servers and other heat-generating electronic equipment, as well as auxiliary data center equipment) and the electrical power 407 from the grid is backup power. In some aspects, two or more of the electrical power 437, the electrical power 435, or the electrical power 443 are electrically coupled to switchgear (not shown) such that electrical power generated by the power plant 408 may be switched between the illustrated components of the integrated system 400.

As further shown in FIGS. 4A-4B, in some aspects, thermal energy (heat) 439*a/b* that is generated from the generation of electrical power by the power plant 408 may be provided (e.g., in a heated fluid or otherwise) to the DAC system 406. In some aspects, the thermal energy 439*a/b* may be combined with, or used in place of, a heated supply liquid 425 that is provided to the DAC system 406 from the heat pump system 404 (or combined with or used in place of the heated supply fluid 409 from the data center 402).

In some aspects, the thermal energy 439*a* may be routed directly to the DAC system 406, e.g., with little to no purposeful temperature change to the thermal energy 439*a*. For instance, in such cases where a temperature of the thermal energy 439*a* from the power plant 408 is appropriate (e.g., at a temperature or within a temperature range) for the dissolution of the bonds between the carbon dioxide and the sorbent in the DAC system 406, then direct routing of the thermal energy 439*a* to the DAC system 406 may be appropriate. In this example, the thermal energy 439*a* may be combined with or otherwise included with the heated supply liquid 425 from the heat pump system 404. In such examples, the thermal energy 439*a* and the heated supply liquid 425 may be at approximately the same or similar temperature; thus no further heating of the thermal energy 439*a* is needed.

Alternatively, the thermal energy 439*b* may be routed first to a portion of the heat pump system 404 to raise the temperature of the thermal energy 439*b*. For example, as shown in FIG. 4A, the thermal energy 439*b* may be combined with or otherwise included with a heated return liquid 426 from the heat pump system 404. In such examples, the thermal energy 439*b* and the heated return liquid 426 may be heated in a heat exchanger 422 of the heat pump system 404 prior to providing such thermal energy to the DAC system 406. In alternative aspects, the thermal energy 439*b* may be provided to an independent heating system (e.g., heat pump system or otherwise) rather than a portion of the heat pump system 404 if further heating of the thermal energy 439*b* is needed.

In some aspects, the thermal energy 439*a* may be routed directly to the DAC system 406 subsequent to cooling of the thermal energy 439*a*. For example, in some aspects, the thermal energy 439*a* may be too hot for use by the DAC system 406. Thus, the thermal energy 439*a* may be cooled prior to using it with or combining it with the heating supply liquid 425. As one example, the thermal energy 439*a* may first be provided to power one or more absorption chillers (e.g., to provide cooling to the data center 402) prior to providing the cooled thermal energy 439*a* to the DAC system 406. As another example, the thermal energy 439*a* may first be cooled to an ambient environment (e.g., within one or more cooling towers or other evaporative coolers) prior to providing the cooled thermal energy 439*a* to the DAC system 406.

As shown in this example implementation, the scrubbing system 410 also receives an exhaust fluid 441 from the power plant 408. For example, in some aspects, the power plant 408 may be a natural gas power plant in which natural gas is combusted to drive electrical power generation equipment that operates to generate the electrical power shown in FIGS. 4A-4B. In other aspects, the power plant 408 may use other carbon-based fuel rather than natural gas. In still other aspects, the power plant 408 may use non-carbon based fuels to generate electrical power (e.g., geothermal, solar, and other). For a natural gas power plant 408, although not shown specifically here, such equipment may include, for example, a compressor rotatably coupled to a gas turbine that drives the compressor. The gas turbine receives combustion products fluid from a combustion chamber that receives compressed natural gas from the compressor. The combustion products fluid drives the gas turbine, which in turn is coupled to and drives a generator to produce electrical power. Output from such a gas turbine (at a lower pressure than the combustion products fluid) is exhaust fluid 441 (e.g., as a flue gas). A difference in pressure between the combustion products fluid and the exhaust fluid 441 drives the gas turbine to produce electrical power from the generator. As shown in this example, the exhaust fluid 441 is separated by the scrubbing system 410 into multiple output streams. For example, similar to the DAC system 406, outputs of a carbon dioxide supply stream 431 and a carbon dioxide-reduced airflow output stream 447 may be output from the scrubbing system 410.

In an example operation of carbon dioxide production system 400, heat from the data center 402 is transferred to the refrigerant circuit 416 of heat pump 405*a* via heated supply fluid 409 in heat exchanger 412. In some aspects, heated supply fluid 409 is between about 35-50° C. and heated return fluid 403 is between about 20-35° C.

Next, heat of compression from compressor 413 is added to the refrigerant circuit 416 to combine with the heat from data center 402. The combined heat (e.g., thermal energy) of the refrigerant circuit 416 is transferred to the refrigerant circuit 420 in heat exchanger 415. In some aspects, the refrigerant circuit 416 enters the heat exchanger 412 between about 35-50° C. and enters the heat exchanger 415 between about 50-65° C.

Next, heat of compression from compressor 417 is added to the refrigerant circuit 420 to combine with the heat from data center 402 and heat of compression of compressor 413. The combined heat (e.g., thermal energy) of the refrigerant circuit 420 is transferred to the refrigerant circuit 424 in heat exchanger 418. In some aspects, the refrigerant circuit 420 enters the heat exchanger 415 between about 50-65° C. and enters the heat exchanger 418 between about 80-95° C.

Next, heat of compression from compressor 421 is added to the refrigerant circuit 424 to combine with the heat from data center 402 and heat of compression of compressors 413 and 417. The combined heat (e.g., thermal energy) of the refrigerant circuit 424 is transferred to the heated supply liquid 425 in heat exchanger 422. In some aspects, the refrigerant circuit 424 enters the heat exchanger 418 between about 65-80° C. and enters the heat exchanger 422 at about or more than 95° C. Heated supply liquid 425 may exit the heat exchanger 422 and enter the carbon dioxide source material 428 at greater than 95° C.

In some aspects, the thermal energy 439*a* from the power plant 408 may be added to or combined with the heated supply liquid 425. The combined energy of the thermal energy 439*a* and the heated supply liquid 425 is provided to the DAC system 406 in order to separate the carbon dioxide from the carbon dioxide source material 428 to generate the carbon dioxide stream 431 and the carbon dioxide free stream 445. In other aspects, the thermal energy 439*b* from the power plant 408 may be added to or combined with the heated return liquid 426 and the combined stream is further heated in the heat exchanger 422. The combined energy of the heated thermal energy 439*b* and the heated return liquid 426 is provided to the DAC system 406 (as heated supply liquid 425) in order to separate the carbon dioxide from the carbon dioxide source material 428 to generate the carbon dioxide stream 431 and the carbon dioxide free stream 445.

As the heat pump system 404 and DAC system 406 operate, the power plant 408 provides electrical power 437 to the data center 402 or the heat pump system, or both (or neither). Further, as the heat pump system 404 and DAC system 406 operate, the power plant 408 may provide electrical power 435 to the DAC system 406. Further, as the heat pump system 404 and DAC system 406 operate, the power plant 408 may provide electrical power 443 to the scrubbing system 410.

In addition, as the heat pump system 404 and DAC system 406 operate, the power plant 408 may provide exhaust fluid 441 (e.g., a $CO_2$-laden flue gas) to the scrubbing system 410. The scrubbing system 410 operates to separate the exhaust fluid 441 into the carbon dioxide stream 431 and the carbon dioxide free stream 447. The carbon dioxide streams 431 (from the DAC system 406 and the scrubbing system 410) may be used for $CO_2$-EOR, sequestration, other hydrocarbon producing operations, or other industrial operations besides hydrocarbon producing operations. In some aspects, the carbon dioxide supply streams 431 may be sold. For example, the carbon dioxide supply streams 431 may generate revenue through emissions credits and federal tax credits. In some aspects, such revenue may offset capital and/or operations costs of the DAC system 406, the power plant 408, both, or other components of the system 400.

The integrated system 400 may advantageously utilize the power plant 408, which may normally be sitting idle, to produce a saleable product in the carbon dioxide fluid streams 431, which also provide environmental benefits. Additionally, in the event of a power outage at the data center 402, the power plant 408 would already be running, meaning the delay between the outage and providing the data center 402 with power would be reduced. Further, by using the thermal energy from the data center 402 and power plant 408, operating costs of the DAC system 406 may be significantly reduced, allowing for the carbon dioxide captured to finance the construction of the DAC system 406 as well as help subsidize the cost of the industrial process's backup power. In addition, the integrated system 400 may produce water from ambient humidity as the DAC system 406 pulls carbon dioxide from the air. The water can be sold or used, e.g., at the data center 402 (e.g., for make-up water for cooling towers or otherwise).

Alternative implementations of carbon dioxide production system 400 may include additional or fewer components. For example, in some aspects, one or more dry coolers may be added to or a part of the carbon dioxide DAC system 406 and a flow of one or more of the illustrated heated refrigerants of the heat pump system 404 may be circulated to the dry coolers. Thus, heat not used to separate the carbon dioxide from the carbon dioxide source material 428 may be transferred to an ambient environment through the one or more dry coolers.

As another example alternative implementation, one or more evaporative coolers may be added to be in fluid communication with the data center 402 and coupled in parallel to the heat exchanger 412. Thus, in some aspects, the heated supply fluid 409 may be diverted to the one or more evaporative coolers, e.g., in the event of a failure of the heat pump system 404 or otherwise.

As yet another example, in some example implementations, the heat pump system 404 may be removed from the carbon dioxide production system 400 and heated supply fluid 409 may be circulated directly to the heat exchanger 422 to heat the heated supply liquid 425. In such examples, a temperature of the heated supply fluid 409 may be great enough to heat the heated supply liquid 425 to a temperature sufficient to break the bonds that connect the captured carbon dioxide in the carbon dioxide source material 428 from the solid or liquid sorbent.

Given the integrated economic factors of the integrated system 400, such as the use of waste heat provided to the DAC system 406, the production of one or more revenue-generating carbon dioxide streams 431, operation of the integrated system 400 may vary according to such economic factors. For example, in some aspects, the data center 402 may be largely a cost-generator rather than a revenue-generator, as the operation of the data center 402 may include operational (to say nothing of capital) expenditures without a corresponding revenue stream. On the other hand, the DAC system 406 (and scrubbing system 410) may largely be a revenue-generator due to the production of a saleable product, namely, the carbon dioxide streams 431. Thus, in some periods of operation, the data center 402 may be reduced in operation to the benefit of the DAC system 406 and scrubbing system 410. Such reduction may occur in the form of switching electrical power from the power plant 408 away from the data center 402 and to the DAC system 406, the scrubbing system 410, or both (or other components of the system 400). Alternatively, to the extent the data center 402 may be a revenue-generating part of the system 400 (e.g., such as a collocated data center in which "tenants" lease server power from the owner of the data center 402), more electrical power may be routed to the data center 402 from the power plant 408 (and, possible, away from the DAC system 406).

Each of the configurations described and shown in this disclosure may include process streams (e.g., refrigerants, liquids, fluids) within a system for capturing carbon dioxide from gaseous sources, including dilute sources such as the atmosphere, and then separating the captured carbon dioxide with thermal energy from waste heat. The process streams can be flowed using one or more flow control systems implemented throughout the system. A flow control system can include one or more flow pumps to pump the process streams, one or more fans or blowers to move gaseous process streams, one or more flow pipes through which the process streams are flowed and one or more valves to regulate the flow of streams through the pipes.

In some implementations, a flow control system can be operated manually. For example, an operator can set a flow rate for each pump and set valve open or close positions to regulate the flow of the process streams through the pipes in the flow control system. Once the operator has set the flow rates and the valve open or close positions for all flow control systems distributed across the system for converting calcium oxide to calcium hydroxide, the flow control system can flow the streams under constant flow conditions, for example, constant volumetric rate or other flow conditions. To change the flow conditions, the operator can manually operate the flow control system, for example, by changing the pump flow rate or the valve open or close position.

In some implementations, a flow control system can be operated automatically. For example, the flow control system can be connected to a computer or control system (e.g., a control system 999 communicably coupled to all or some of the described components of either of integrated system 300 or integrated system 400) to operate the flow control system. The control system 999 can include a computer-readable medium storing instructions (such as flow control instructions and other instructions) executable by one or more processors to perform operations (such as flow control operations). An operator can set the flow rates and the valve open or close positions for all flow control systems distributed across the facility using the control system. In such implementations, the operator can manually change the flow conditions by providing inputs through the control system 999. Also, in such implementations, the control system 999 can automatically (that is, without manual intervention) control one or more of the flow control systems, for example, using feedback systems connected to the control system 999. For example, a sensor (such as a pressure sensor, temperature sensor or other sensor) can be connected to a pipe through which a process stream flows. The sensor can monitor and provide a flow condition (such as a pressure, temperature, or other flow condition) of the process stream to the control system 999. In response to the flow condition exceeding a threshold (such as a threshold pressure value, a threshold temperature value, or other threshold value), the control system 999 can automatically perform operations. For example, if the pressure or temperature in the pipe exceeds the threshold pressure value or the threshold temperature value, respectively, the control system 999 can provide a signal to the pump to decrease a flow rate, a signal to open a valve to relieve the pressure, a signal to shut down process stream flow, or other signals.

Figure 5:
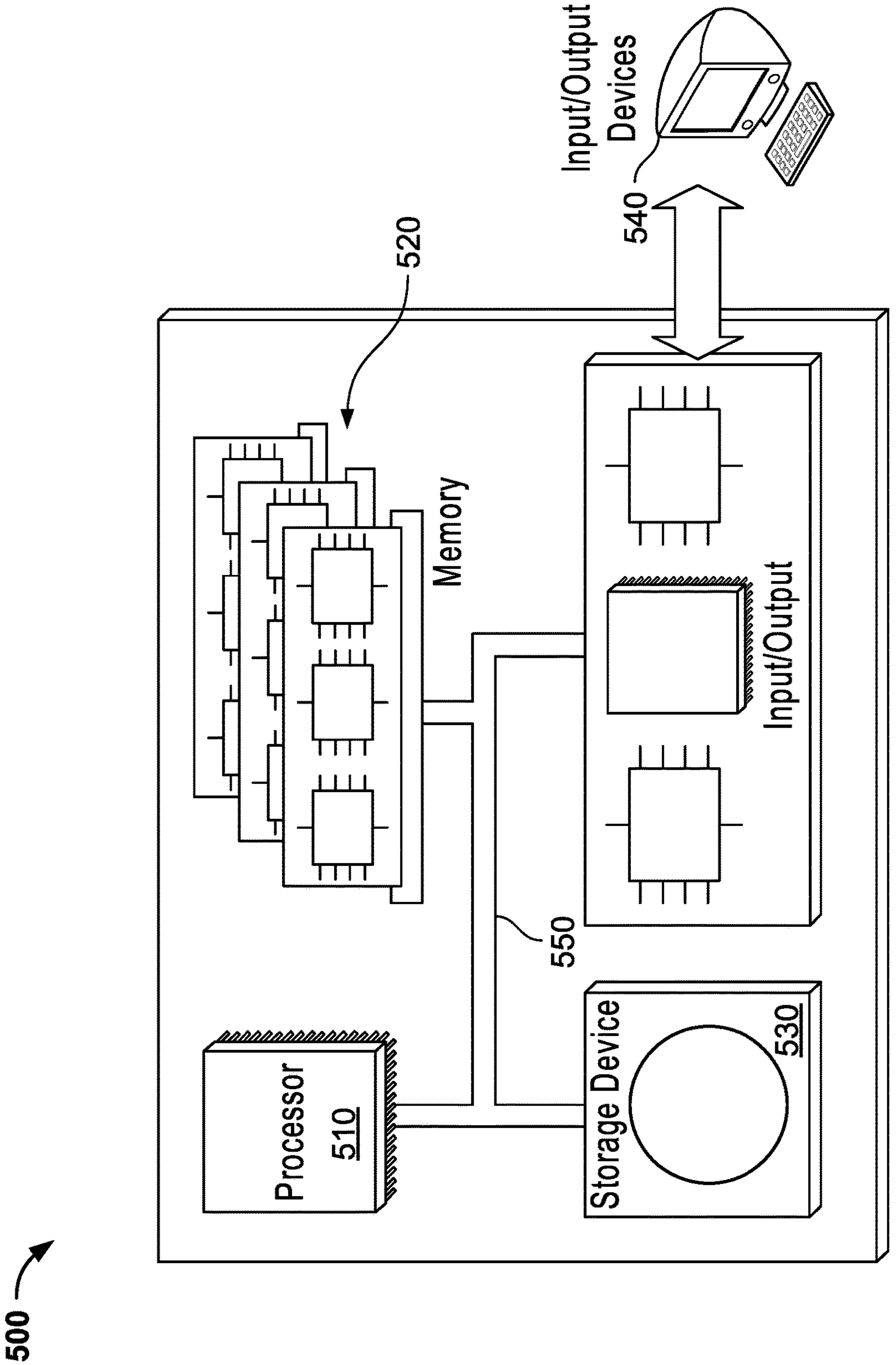
FIG. 5 is a schematic illustration of a control system according to the present disclosure.

FIG. 5 is a schematic diagram of a control system 500. The system 500 can be used for the operations described in association with any of the operations described previously, for example as or as part of the control system 999. The system 500 is intended to include various forms of digital computers, such as laptops, desktops, workstations, personal digital assistants, servers, blade servers, mainframes, and other appropriate computers. The system 500 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A direct air capture (DAC) system, comprising:

an ambient airflow input through which ambient air enters the DAC system;

a carbon dioxide output;

a carbon dioxide source material disposed within an airflow path between the airflow input and the carbon dioxide output, the carbon dioxide source material comprising an adsorbent to which carbon dioxide from the ambient air bonds, wherein the adsorbent comprises a solid adsorbent;

a circuit configured to flow the adsorbent with the circuit; and a heating system configured to heat a heating fluid and transfer heat from the heating fluid to the carbon dioxide source material, wherein the carbon dioxide source material is arranged to receive heat from the heating fluid, and wherein the heating system is configured to add thermal energy to the heating fluid, and wherein, when heated, adsorbed carbon dioxide is separated from the carbon dioxide source material and provided as a carbon dioxide output.

2. The system of claim 1, wherein the heating system is configured to heat the heating fluid using waste heat from an outside source; and wherein the heating system comprises a supplemental heating system configured to heat the heating fluid using the waste heat of the outside source and add supplemental thermal energy to the heating fluid.

3. The DAC system of claim 2, wherein the outside source comprises an industrial process.

4. The system of claim 2, wherein the supplemental heating system comprises at least one thermodynamic cycle comprising a refrigerant fluid thermally coupled to the heating fluid, the refrigerant fluid comprising a thermal energy from at least a portion of the waste heat and a heat of compression of the at least one thermodynamic cycle.

5. The system of claim 4, wherein the at least one thermodynamic cycle comprises at least one vapor-compression cycle, and the heating system comprises a heat-pump system.

6. The system of claim 5, wherein the at least one vapor-compression cycle comprises a compressor, a condenser, an evaporator, and an expansion device fluidly coupled in a refrigerant circuit that comprises the refrigerant fluid.

7. The system of claim 6, wherein the at least one vapor-compression cycle comprises:

a first vapor-compression cycle comprising:

a first heat exchanger, a first refrigerant fluid thermally coupled to the heating fluid in the first heat exchanger, a first compressor fluidly coupled to the first heat exchanger, a second heat exchanger fluidly coupled to the first compressor, and a first expansion device fluidly coupled to the second heat exchanger; and a second vapor-compression cycle comprising:

the second heat exchanger, a second refrigerant fluid thermally coupled to the first refrigerant fluid in the second heat exchanger, a second compressor fluidly coupled to the second heat exchanger, a third heat exchanger fluidly coupled to the second compressor, and a second expansion device fluidly coupled to the third heat exchanger.

8. The system of claim 7, wherein the carbon dioxide source material is thermally coupled to the second refrigerant fluid, as the heating fluid, to receive a portion of the thermal energy from the second refrigerant fluid to separate carbon dioxide from the carbon dioxide source material, the portion of the thermal energy comprising the portion of the waste heat from the outside source and a heat of compression of the first and second compressors.

9. The system of claim 8, wherein the at least one vapor-compression cycle further comprises:

a third vapor-compression cycle comprising:

the third heat exchanger, a third refrigerant fluid thermally coupled to the second refrigerant fluid in the third heat exchanger, a third compressor fluidly coupled to the third heat exchanger, a fourth heat exchanger fluidly coupled to the third compressor, and a third expansion device fluidly coupled to the fourth heat exchanger.

10. The system of claim 9, wherein the carbon dioxide source material is thermally coupled to the third refrigerant fluid, as the heating fluid, to receive the portion of the thermal energy to separate carbon dioxide from the carbon dioxide source material, the portion of the thermal energy comprising the portion of the waste heat from the outside source and a heat of compression of the first, second, and third compressors.

11. The system of claim 1, wherein the carbon dioxide source material comprises a filter and the adsorbent is flowed within the circuit to transfer the carbon dioxide from the filter to the carbon dioxide output.

12. The system of claim 1, wherein the heating system comprises a heat-pump system.

13. A carbon dioxide capture method, comprising:

capturing carbon dioxide from a flow of ambient air by a carbon dioxide source material of a direct air capture (DAC) system, wherein the carbon dioxide source material comprises an adsorbent to which carbon dioxide adsorbs from the ambient air bonds, and wherein the adsorbent comprises a solid adsorber;

flowing the adsorbent within a circuit of the DAC system;

heating a heating fluid by adding thermal energy to the heating fluid;

transferring heat from the heating fluid to the carbon dioxide source material, wherein the carbon dioxide source material receives a portion of the heat from the heating fluid;

separating, with the transferred portion of the heat, the carbon dioxide from the carbon dioxide source material of the DAC system; and providing the carbon dioxide to an output carbon dioxide supply stream.

14. The method of claim 13, wherein the carbon dioxide source material comprises a filter.

15. The method of claim 14, wherein capturing the carbon dioxide comprises:

passing the flow of ambient air over or through the filter; and passing the adsorbent over the filter to obtain a carbon dioxide rich adsorbent, and wherein separating the carbon dioxide comprises heating the carbon dioxide rich adsorbent, thereby obtaining a carbon dioxide lean adsorbent, and wherein the method further comprises returning the carbon dioxide lean adsorbent back to the filter via the circuit.

16. The method of claim 13, wherein the heating of the heating fluid uses waste heat from an outside source; and wherein a heating system in the DAC system comprises a supplemental heating system configured to heat the heating fluid using the waste heat of the outside source and add supplemental thermal energy to the heating fluid.

17. The method of claim 16, wherein heating the heating fluid comprises transferring at least a portion of the waste heat from the heat transfer fluid from the outside source to a refrigerant fluid circulating through at least one thermodynamic cycle of the heating system, the refrigerant fluid comprising a thermal energy from a portion of the waste heat from the outside source and a heat of compression of the at least one thermodynamic cycle.

18. The method of claim 17, wherein the at least one thermodynamic cycle comprises at least one vapor-compression cycle, and the heating system comprises a heat-pump system.

19. The method of claim 18, wherein the at least one vapor-compression cycle comprises a compressor, a condenser, an evaporator, and an expansion device fluidly coupled in a refrigerant circuit that comprises the refrigerant fluid.

20. The method of claim 17, wherein transferring the portion of the waste heat from the heat transfer fluid to the refrigerant fluid circulating through the at least one vapor-compression cycle of the heat-pump system comprises:

transferring the portion of the waste heat from the heat transfer fluid to a first refrigerant fluid thermally coupled to the heat transfer fluid in a first heat exchanger of a first vapor-compression cycle;

compressing the first refrigerant fluid in a first compressor fluidly coupled to the first heat exchanger to add a first heat of compression to the first refrigerant fluid;

transferring a thermal energy from the first refrigerant fluid that comprises the portion of the heat from the heat transfer fluid and the first heat of compression to a second refrigerant fluid of a second vapor-compression cycle in a second heat exchanger fluidly coupled to the first compressor; and compressing the second refrigerant fluid in a second compressor fluidly coupled to the second heat exchanger to add a second heat of compression to the second refrigerant fluid.

* * * * *